March 25, 1930. W. G. WEHR Re. 17,629

I-BEAM CLAMP

Original Filed March 11, 1927

Inventor
William G. Wehr
Kerr Hudson & Kent
attys.

Reissued Mar. 25, 1930 Re. 17,629

UNITED STATES PATENT OFFICE

WILLIAM G. WEHR, OF EAST CLEVELAND, OHIO, ASSIGNOR TO THE CLEVELAND CRANE & ENGINEERING COMPANY, OF WICKLIFFE, OHIO, A CORPORATION OF OHIO

I-BEAM CLAMP

Original No. 1,658,956, dated February 14, 1928, Serial No. 174,609, filed March 11, 1927. Application for reissue filed January 13, 1930. Serial No. 420,619.

This invention relates to flanged beam clamps for use generally for suspension from I-beams and which is particularly useful for attaching flexible hangers for suspending tracks for overhead carriers, the invention having for its object to provide a clamp for hangers which when secured to the flanges of the beam is effectually held against creeping movement along the said flanges.

Suspended monorail and other tracks for overhead carriers are usually supported from the beams of the building in which the track system is placed by means of flexible hangers. Since there is considerable swaying of the hangers during the passage of carriers along the tracks there is a tendency for the hanger supports to creep along the beams to which they are attached. The creeping can be prevented by bolting the hanger supports to the beams but this method of attachment is objectionable by reason of the labor incident to the installation of the overhead, by reason of the fact that the bolt holes weaken the beams and by reason of the difficulty incidental to shifting the position of the overhead trackway as is frequently desirable in practice. For this reason it has been common practice to employ clamps in securing hangers to the beams but where clamps have been employed there has been considerable difficulty due to the creeping of the clamps along the flanges of the beams, making it necessary to frequently readjust the clamps to maintain the suspended track in proper alignment.

It is the object of the present invention to provide a clamp which will so engage the flanges of the beam as to effectually resist the forces tending to move the same along the beam and which will form a rigid anchor for the flexible track hanger.

A further object is to provide a clamp which may be attached to flanged beams of various sizes.

With the above and other objects in view, the invention may be said to comprise a device as illustrated in the accompanying drawings hereinafter described and particularly set forth in the appended claims together with such variations and modifications as will be apparent to one skilled in the art to which the invention appertains.

Reference should be had to the accompanying drawings forming a part of this specification in which.

Figure 1:
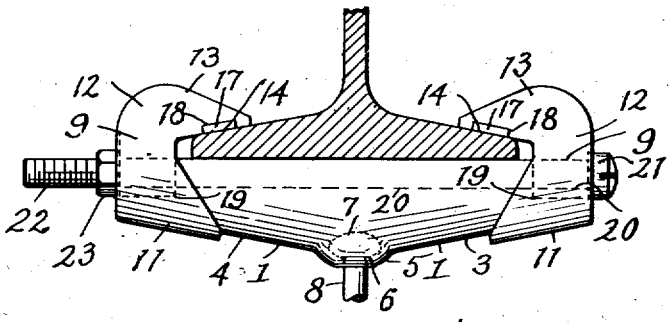
Fig. 1 is a transverse section through a beam showing a clamp attached to the beam in side elevation.

Referring to the accompanying drawings, the clamp includes a channel-shaped hanger bar 1 which has parallel side flanges 2 which have straight edges adapted to engage the bottom of the beam which is here shown as an I-beam. The hanger bar 1 has wedge-shaped ends gradually increasing in depth toward the center of the bar, being provided with transversely rounded, inwardly inclined bottom portions 3 and 4 at the opposite ends. At the center of the bar there is a depressed seat 5 which has a central opening 6 and this seat is adapted to support the rounded head 7 of a hanger bolt 8 which extends through the opening 6 which is of somewhat larger diameter than the bolt to permit the bolt to swing in any direction. The hanger bolt 8 forms a support for a suspended track which may be attached to the bolt in any suitable manner.

The hanger bar 1 is of uniform width from end to end and the inclined bottom portions 3 and 4 thereof are of uniform transverse curvature, and the bar 1 is adapted to be secured against the bottom of an I-beam by means of clips 9 which are U-shaped and formed to fit upon the exterior of the bar 1, the clips 9 having inclined bottom portions 11 fitting the inclined bottom portions 3 and 4 of the bar and having upwardly extending sides 12 which overlie the flanges 2 of the bar. At their upper ends the sides 12 of the clips have inwardly extending integral projections or lugs 13 which are provided with inclined lower edges 14 which are adapted to fit and ride upon the top surfaces of the oppositely extending lower flanges of an I-beam. Each of the clips 9 has a U-shaped attachment 15 upon the interior thereof and each of these attachments has vertical sides 16 which bear against the sides 12 of the clip and each of the sides 16 is provided with an outwardly extending lug 17 which extends through a notch 18 in the adjacent side 12 of the clip, the notches 18 being in the flange engaging edge 14 of the clip and of the same depth as of the flanges 17 so that the flanges 17 are clamped against the top surfaces of the I-beam flanges when the clamp is secured to the I-beam. Each of the attachments 15 is provided with a downwardly projecting loop 19 which extends into the channel of the hanger bar 1, and these loops are adapted to receive a bolt 20 which extends longitudinally of the bar 1 in the channel thereof. The bolt 20 is provided at one end with a head 21 which engages one of the loops 19 and at its opposite ends has a threaded portion 22 which receives a nut 23 adapted to bear against the loop 19 of the other clip. One of the loops 19 may be provided with shoulders 24 to engage with the nut 23 to prevent the same from turning so that by rotating the bolt 20 the clips 9 may be forced toward each other.

Figure 2:
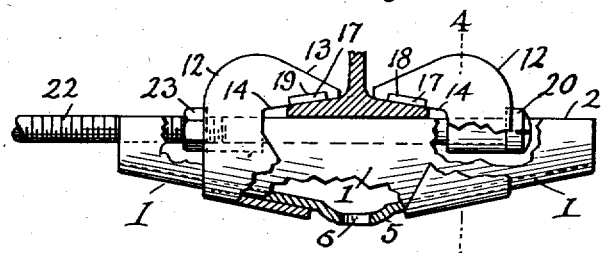
Fig. 2 is a view similar to Fig. 1 showing the same clamp attached to a smaller I-beam.
Figure 3:
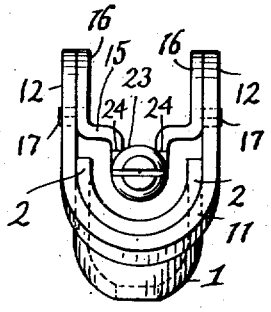
Fig. 3 is an end elevation of the clamp.
Figure 4:
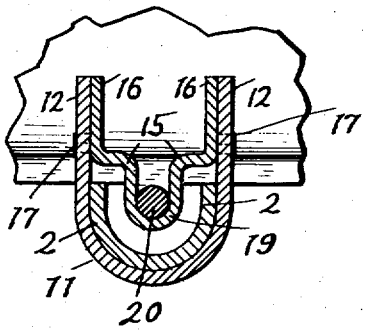
Fig. 4 is a section taken on the line indicated at 4—4 in Fig. 2.

When the clamp is applied to an I-beam the projections 13 of the clips are placed in engagement with the flanges and the bolt 20 is rotated to draw the clips toward each other. During the inward movement of the clips the edges 14 engaging the upper surfaces of the beam flanges tend to draw the clips and the hanger bar supported by the clips upwardly toward the beam. At the same time the inclined portions 11 of the clips sliding on the inclined wedge portions 3 and 4 of the hanger bar crowd the hanger bar upwardly toward the beam. When the clips are tightened the oppositely extending flanges of the I-beam are very tightly clamped between the projecting lugs of the clips and the upper edge of the hanger bar by reason of the wedging action between the clips and the inclined top surfaces of the I-beam flanges and by reason of the wedging action between the bottom portions 11 of the clip and the inclined bottom portions 3 of the hanger bar so that a heavy gripping pressure is exerted upon the I-beam flanges and the clamp is securely anchored against creeping movement along the I-beam. By reason of the fact that the flange engaging portions of the clips are gradually moved toward the upper edge of the hanger bar as the clips are moved toward each other, the same clamp may be applied to I-beams of widely different sizes. In Fig. 1 the clamp is shown applied to an I-beam of comparatively large size, and in Fig. 2 the same clamp is shown applied to an I-beam of much smaller size.

1. A clamp for flanged beams comprising a pair of clips having oppositely inclined portions adapted to have wedging engagement with opposite flanges of a beam, a hanger bar supported by said clips and engageable with the bottom of the beam, said clips being capable of movement within the extremities of said bar, and means for drawing said clips together to grip the flanges of the beam between said inclined portions of the clips and said hanger bar.

2. A clamp for flanged beams comprising a hanger bar engageable with the bottom of a beam, and means for rigidly clamping said hanger bar to the beam comprising a pair of clips slidable on said bar and engageable with the upper faces of opposite flanges of the beam, and means independent of said bar for drawing said clips together.

3. A clamp for flanged beams comprising a hanger bar having an upper edge engageable with the bottom of a beam and outwardly tapering wedge-shaped ends, a pair of clips slidable on said bar, and movable inwardly beyond the ends thereof, each clip having outwardly converging faces, one engageable with the top of the beam flange and the other with a tapering end of said hanger bar, and means for drawing said clips toward each other to clamp said hanger bar against the bottom of the beam.

4. A clamp for flanged beams comprising a hanger bar having an upper edge engageable with the bottom of a beam and outwardly tapering wedge-shaped ends, a pair of clips slidable on said bar and adapted for movement inwardly beyond the ends of the bar for engagement with flanges of different size beams, each clip having outwardly converging faces, one engageable with the top of the beam flange and the other with a tapering end of said hanger bar, and a bolt connecting said clips by which the clips may be drawn toward each other to clamp the hanger bar against the bottom of the beam and to grip the flanges of the beam between the hanger bar and clips.

5. A clamp for flanged beams comprising a hanger bar adapted to engage the bottom of a beam, a pair of clips slidably mounted on said bar and adapted for movement inwardly beyond the ends of the bar, said clips being engageable with the inclined surfaces of the flanges of the beam, and means for simultaneously moving said clips toward each other inwardly from the ends of said bar and angularly with respect to the hanger bar to grip each flange of the beam between said hanger bar and a clip.

6. A clamp for flanged beams comprising a hanger bar adapted to engage the outer surface of a beam flange, a pair of clips adapted to engage the inclined surfaces of clips and bar having coacting guide portions which cause movement of the clips transversely of the bar upon longitudinal movement of said clips, and means connecting said clips for simultaneously moving them toward each other and transversely with respect to the bar to grip the flanges of the beam between the clips and bar.

7. A clamp for flanged beams comprising a channel-shaped hanger bar having straight edges at its open side adapted to engage the bottom of a beam, clips slidable upon opposite end portions of said bar, said clips having portions engageable with the top surfaces of opposite flanges of the beam and portions embracing said hanger bar, said clips also having portions projecting into the channel of said hanger bar, and a bolt connecting said projecting portions of the clips.

8. A clamp for flanged beams comprising a channel-shaped hanger bar having straight edges at its open side adapted to engage the bottom of a beam, said bar having wedge-shaped ends increasing in depth toward the center of the bar, U-shaped clips slidable upon the opposite ends of the hanger bar, said clips having bottom portions inclined to conform to the inclined bottom portions of the hanger bar and having inwardly projecting lugs at their upper ends engageable with the top surfaces of the beam flanges, each clip having a portion extending into the channel of the hanger bar, and a bolt within the channel connecting said extending portions of the clips to draw said clips together.

9. A clamp for flanged beams comprising a hanger bar adapted to engage the outer surface of a beam flange, a pair of clips having portions adapted to have a wedging engagement with the inclined surfaces of the beam flanges and portions in wedging engagement with said hanger bar, and means for drawing said clips together inwardly beyond the ends of said bar to grip the flanges of the beam between the flange engaging portions of the clips and the hanger bar.

In testimony whereof, I hereunto affix my signature.

WILLIAM G. WEHR.